United States Patent
Karaoguz et al.

(10) Patent No.: US 9,198,030 B2
(45) Date of Patent: Nov. 24, 2015

(54) METHOD AND SYSTEM FOR A NETWORKED SELF-CONFIGURING COMMUNICATION DEVICE UTILIZING USER PREFERENCE INFORMATION

(75) Inventors: Jeyhan Karaoguz, Irvine, CA (US); Arya Behzad, Poway, CA (US); Mark Buer, Gilbert, AZ (US); Alexander G. MacInnis, Ann Arbor, MI (US); Thomas Quigley, Franklin, NC (US); John Walley, Ladera Ranch, CA (US)

(73) Assignee: Broadcom Corporation, Irvine, CA (US)

( * ) Notice: Subject to any disclaimer, the term of this patent is extended or adjusted under 35 U.S.C. 154(b) by 1802 days.

(21) Appl. No.: 12/138,249

(22) Filed: Jun. 12, 2008

(65) Prior Publication Data

US 2008/0313315 A1    Dec. 18, 2008

Related U.S. Application Data

(60) Provisional application No. 60/943,484, filed on Jun. 12, 2007.

(51) Int. Cl.
*G06F 15/177* (2006.01)
*H04W 8/24* (2009.01)
*H04W 8/18* (2009.01)
*H04W 8/20* (2009.01)

(52) U.S. Cl.
CPC ............... *H04W 8/245* (2013.01); *H04W 8/18* (2013.01); *H04W 8/205* (2013.01)

(58) Field of Classification Search
USPC ............................ 709/222–227, 203, 204, 250
See application file for complete search history.

(56) References Cited

U.S. PATENT DOCUMENTS

| | | | |
|---|---|---|---|
| 6,671,563 B1 * | 12/2003 | Engelson et al. | 700/2 |
| 6,898,623 B1 * | 5/2005 | Williams et al. | 709/206 |
| 7,107,106 B2 * | 9/2006 | Engleson et al. | 700/2 |
| 7,721,104 B2 * | 5/2010 | Salo et al. | 713/176 |
| 7,965,825 B1 * | 6/2011 | Herriman et al. | 379/100.08 |

(Continued)

OTHER PUBLICATIONS

Seagate Technology LLC, Seagate D.A.V.E. (Digital Audio Video Experience) Transform the consumer digital content experience with the Seagate D.A.V.E. design concept, Data Sheet, 2007.

(Continued)

*Primary Examiner* — Jude Jean Gilles
(74) *Attorney, Agent, or Firm* — Oblon, McClelland, Maier & Neustadt, L.L.P.

(57) ABSTRACT

A first personal electronic (PE) device may enable generation, updating, and/or storage of user configuration information. The user configuration information may comprise information pertaining to device configuration and/or operational preferences specific to the device user and/or various use settings, connectivity, and/or use of available resources. The generation, updating, and/or storage of the user configuration information may be performed manually and/or automatically, and may be performed directly within the first PE device and/or via networked devices, which may communicatively coupled to the first PE device. A second PE device may be enabled to be communicatively coupled to the first PE device and/or the networked devices. The second PE device may then be enabled to download existing user configuration information from the first PE device and/or the networked device, and the downloaded user configuration may be utilized to configure the second PE device.

30 Claims, 4 Drawing Sheets

(56) References Cited

U.S. PATENT DOCUMENTS

| | | | |
|---|---|---|---|
| 2003/0005452 A1* | 1/2003 | Rodriguez | 725/86 |
| 2004/0205772 A1* | 10/2004 | Uszok et al. | 719/317 |
| 2006/0183490 A1* | 8/2006 | Madhavan et al. | 455/501 |
| 2008/0134292 A1* | 6/2008 | Ariel et al. | 726/3 |

OTHER PUBLICATIONS

Seagate Technology LLC, Seagate D.A.V.E. (Digital Audio Video Experience) The portable storage platform that collects, plays and manages digital content, Product Overview, 2007.

* cited by examiner

METHOD AND SYSTEM FOR A NETWORKED SELF-CONFIGURING COMMUNICATION DEVICE UTILIZING USER PREFERENCE INFORMATION

CROSS-REFERENCE TO RELATED APPLICATIONS/INCORPORATION BY REFERENCE

This patent application makes reference to, claims priority to and claims benefit from U.S. Provisional Application Ser. No. 60/943484 filed on Jun. 12, 2007.

This application also makes reference to:
U.S. patent application Ser. No. 11/864,184 filed on Sep. 28, 2007;
U.S. patent application Ser. No. 11/861,224 filed on Sep. 25, 2007;
U.S. patent application Ser. No. 11/861,786 filed on Sep. 26, 2007;
U.S. patent application Ser. No. 11/861,220 filed on Sep. 25, 2007;
U.S. patent application Ser. No. 11/864,202 filed on Sep. 28, 2007;
U.S. patent application Ser. No. 11/864,562 filed on Sep. 28, 2007;
U.S. patent application Ser. No. 11/864,407 filed on Sep. 28, 2007;
U.S. patent application Ser. No. 11/864,255 filed on Sep. 28, 2007;
U.S. patent application Ser. No. 11/865,799 filed on Oct. 2, 2007;
U.S. patent application Ser. No. 11/864,095 filed on Sep. 28, 2007; and
U.S. patent application Ser. No. 11/864,383 filed on Sep. 28, 2007.

Each of the above stated applications is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to communication devices. More specifically, certain embodiments of the invention relate to a method and system for a networked self-configuring communication device utilizing user preference information.

BACKGROUND OF THE INVENTION

The field of mobile and/or wireless communication has seen dramatic growth the last few years. In today's world, most people use wireless devices for various purposes, including business and personal, on a constant and daily basis. Society is truly becoming a mobile and wireless one. Numerous wireless solutions have been introduced, and have made a tremendous impact on everyday life.

For example, the use of Wireless Personal Area Networks (WPAN) has been gaining popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). WPAN may be based on standardized technologies, for example Bluetooth (BT) technology. While WPAN may be very beneficial for certain applications, other applications may require larger service areas and/or capabilities.

To satisfy such needs, other technologies have been developed to provide greater wireless service. Wireless Local Area Networks (WLAN) systems may operate within a 100-meter range, for example. In contrast to the WPAN systems, WLAN provide connectivity to devices that are located within a slightly larger geographical area, such as the area covered by a building or a campus, for example. WLAN systems are generally based on specific standards, for example IEEE 802.11 standard specifications, and typically operate within a 100-meter range, and are generally utilized to supplement the communication capacity provided by traditional wired Local Area Networks (LANs) installed in the same geographic area as the WLAN system.

Other forms of wireless solutions have evolved from traditional land-based communication technologies. For instance, cellular phones have become just about an absolute necessity in today's world. While cellular technology was merely intended to add an element of mobility to the traditional telephony service, this technology has grown beyond that initial purpose. Many modern cellular technologies, including such technologies as GSM/GPRS/EDGE, UMTS, and CDMA2000, incorporate substantial data capabilities. Most of today's cellular services include such features as text messaging, video streaming, and web browsing, for example.

Placing various wireless technologies in a single communication device is another trend in the wireless world. For instance, some wireless devices such as cell phones may include WLAN and WPAN functionalities. For example, Bluetooth technology may be utilized to connect a laptop computer or a handheld wireless terminal to a peripheral device, such as a keyboard, mouse, headphone, and/or printer, while the laptop computer or the handheld wireless terminal is also connected to a campus-wide WLAN network through an access point (AP) located within the building.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a networked self-configuring communication device utilizing user preference information, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a networked self-configuring communication device utilizing user preference information. A first personal electronic (PE) device may enable generation, updating, and/or storage of user configuration information. The user configuration information may comprise information pertaining to device configuration and/or operational preferences specific to the device user and/or various use settings, connectivity, and/or use of available resources. The generation, updating, and/or storage of the user configuration information may be performed manually and/or automatically, and may be performed directly within the first PE device and/or via networked devices, which may be communicatively coupled to the first PE device. A second PE device may be enabled to be communicatively coupled to the first PE device and/or the networked devices. The second PE device may then be enabled to download existing user configuration information from the first PE device and/or the networked device, and the downloaded user configuration may be utilized to configure the second PE device.

Figure 1A:
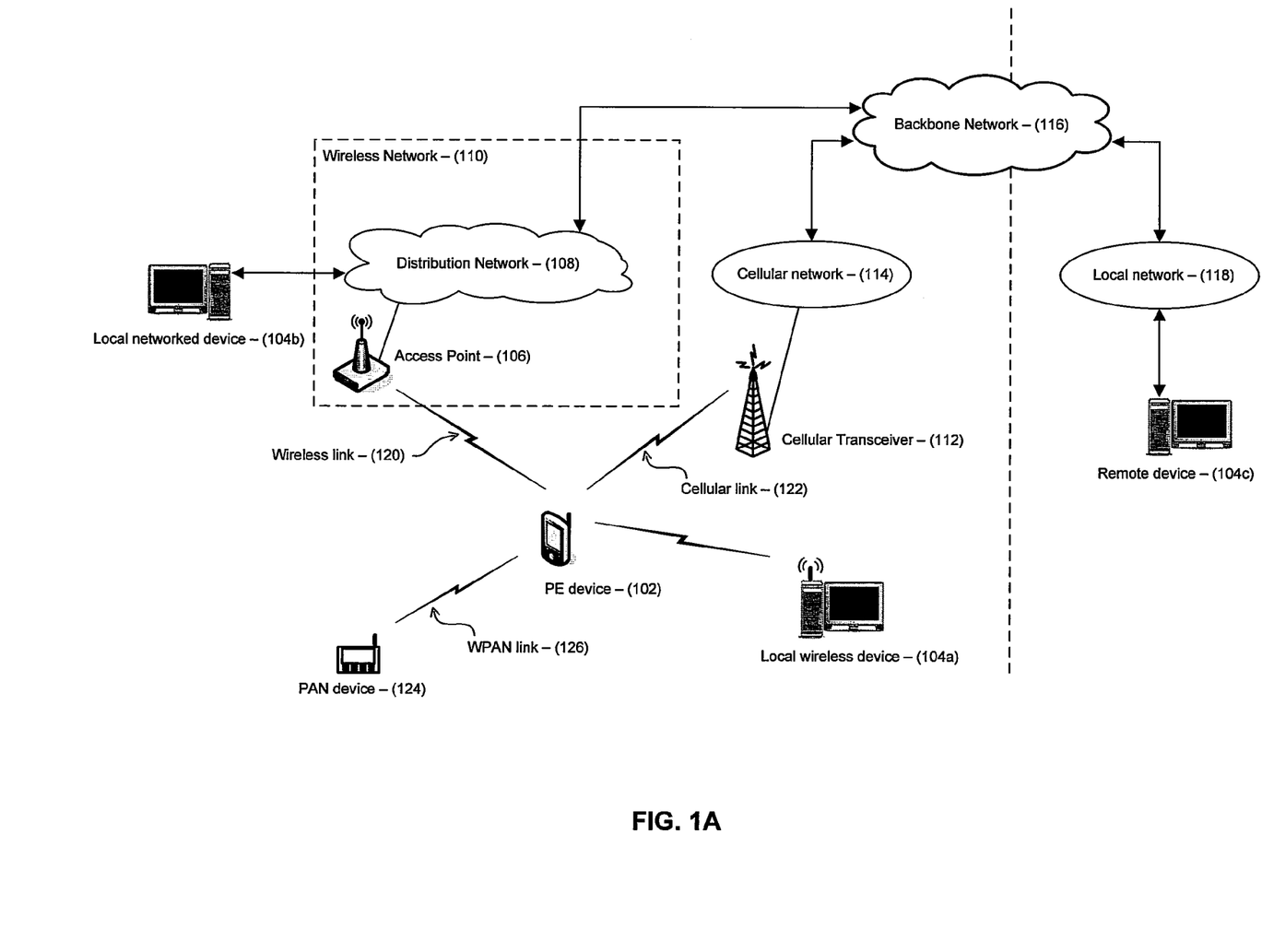
FIG. 1A is a block diagram that illustrates exemplary setup comprising a personal electronic (PE) device, which may be utilized in accordance with an embodiment of the invention.

FIG. 1 is a block diagram that illustrates exemplary setup for a personal electronic (PE) device, which may be utilized in accordance with an embodiment of the invention. Referring to FIG. 1, there is shown a personal electronic (PE) device 102, a local wireless device 104a, a local networked device 104b, a remote device 104c, and an access point 106. FIG. 1 also shows a distribution network 108, a wireless network 110, a cellular transceiver 112, a cellular network 114, a backbone network 116, a local network 118, a wireless link 120, a cellular link 122, a Personal Area Networks (PAN) device 124, and a Wireless Personal Area Networks (WPAN) link 126.

The personal electronic (PE) device 102 may comprise suitable logic, circuitry and/or code that enables performing one or more tasks requested via users of the PE device 102. For example, the PE device 102 may enable personal communication, audio/video recording and/or playing, gaming operations, and/or various other tasks, which may be requested via the PE device 102 by a user. The PE device 102 may be enabled to communicate with one or more of supported wireless and/or wired networks, and may also enable use of local and/or remote resources, to perform tasks requested via the PE device 102 for example. A user of the PE device 102 may utilize the PE device 102 directly, via supported user interfaces within the PE device 102, and/or indirectly via available networks and/or via other devices, such as the PAN device 124, which may interact with the PE device 102 via a communication interface. For example, the PE device 102 may comprise a portable handheld communication device, such as a Smartphone, a cellphone, a PDA, a multimedia device, which may be communicatively coupled to plurality of available networks, resources, and/or other communication devices which may exist locally and/or remotely.

The PE device 102 may comprise functionality that may enable utilizing one or more of available networks, to connect to available devices and/or resources for example. The network connectivity may be achieved directly, wherein the PE device 102 may be connected via wired connections, including, for example, use of a cable and/or optical interface, to LAN and/or WAN networks. The PE device 102 may also comprise one or more wireless communication interfaces, including, for example, WPAN, WLAN, and/or cellular interfaces, which may be operable to provide connectivity to corresponding networks and/or devices. The PE device 102 may comprise a user interface functionality that may enable one or more users to utilize the PE device 102 as an end user device and/or as an end user terminal device.

The PE device 102 may comprise functionality that enables generation, storage, modification, and/or utilization of user configuration information during use of the PE device 102 by a user. The user configuration information may comprise information pertaining to device configuration and/or operational preferences specific to the device user(s) and/or various use settings, connectivity, and/or use of available resources. Additionally, the PE device 102 may also comprise functionality that may enable performing user identification, for authentication and/or security purposes for example. The identification may be performed, for example, based on login information, based on compiled association information, between particular user and particular tasks and/or resource, and/or based on determined physical attributes of the user. The physical attributes of the user may be determined utilizing, for example, biometric based mechanisms within or coupled to the PE device 102. For example, the PE device 102 may comprise a biometric data acquisition subsystem which may enable performing acquisition, validation, and modification of physiological and/or behavioral biometric data. Biometric data, which may comprise finger prints, retina data, or behavioral patterns, may be unique to a person; and thus it may be utilized to identify a particular user. The PE device 102 may be utilized to enable use of plurality of the local and/or remote devices, for example, the local wireless device 104a, the local networked device 104b, and/or the remote device 104c to perform tasks requested by a user via the PE device 102.

The local wireless device 104a may comprise suitable logic, circuitry and/or code that is enabled to communicate with the PE device 102 to perform a function that may be pertinent to a task requested via the PE device 102, and for which the local wireless device 104a may be better suited to perform. The invention may not be limited to a specific device, and may comprise, for example, a general purpose processing device, a specialized processing device, a specialized peripheral device, or any combination of suitable hardware, and/or code, which may be enabled to perform a task requested via the PE device 102. For example, the local wireless device 104a may comprise a high-definition television (HDTV) set, a dedicated audio system, and/or a digital video player device, which may be optimized to provide improved audio and/or video output quality.

The local wireless device 104a may be enabled to communicate with the PE device 102 directly via wireless connections. The local wireless device 104a may be enabled to communicate with the PE device 102 via one or more the wireless protocols supported via the PE device 102, including, for example, WLAN, WiMAX, and/or WPAN such as ZigBee, Ultra-wideband (UWB), and/or Bluetooth. Alternatively, the communication between the local wireless device 104a and the PE device 102 may be performed directly based on device-specific interface, which may comprise suitable functionality that enables forming connections between specific devices. For example, the local wireless device 104a and the PE device 102 may be enabled to utilize a proprietary standard of wireless communication between these devices.

The local networked device 104b may be substantially similar to the local wireless device 104a. However, the local networked device 104b may be enabled to communicate with the PE device 102 indirectly via one or more of available local networks that the PE device 102 may be coupled with, including, for example, wireless network 110, to provide a service that may be pertinent to a task requested via the PE device 102. For example, the local networked device 104b may comprise a personal computer (PC), a printer, scanner, and/or fax device, a dedicated memory storage device, and/or a digital video recorder device. Consequently, the local service resource 104a may be utilized, for example, as a media service device which may provide multimedia streaming that may be read via the PE device 102.

The remote device 104c may be comprised substantially similar to the local networked device 104b and/or the local wireless device. However, the remote device 104c may also comprise functionality to enable remote communication with the PE device 102, via, for example, the cellular network 110, the backbone network 116, and the local network 118. For example, the remote device 104c may comprise a home PC, which may comprise improved processing subsystems and/or increased memory space. Such home PC may be better suited to perform processing and/or storage intensive tasks. The PE device 102 may utilize the remote device 104c, for example, for secure storage of data that may be created and/or maintained in the PE device 102, and/or as a backup depository for media files.

The wireless network 110 may comprise a plurality of the access point 106, the distribution network 108, and suitable logic, circuitry and/or code that may enable implementing a functional block corresponding to a wireless technology. Exemplary wireless technology may comprise for example the WLAN (IEEE 802.11) or the WiMAX (IEEE 802.16) architecture. The access point 106 may comprise suitable hardware, logic, circuitry, and/or code that may provide access network to the wireless network 110 for wireless capable devices, for example the PE device 102. The distribution network 108 may comprise suitable hardware, logic, circuitry, and/or code that may be enabled to operate as a backbone network that may be responsible for transport and link functionality for a plurality of access points in the wireless network 110.

The cellular network 114 may comprise plurality of the cellular transceiver 112, and suitable logic, circuitry and/or code that may enable communication via one or more cellular technologies. Exemplary cellular technologies may comprise CDMA, WCDMA, CDMA1000, HSDPA, GSM, GPRS, EDGE, and UMTS. The cellular transceiver 112 may comprise suitable hardware, logic, circuitry, and/or code that may be utilized to enable transmission and/or reception of cellular based communications between the cellular network 114 and cellular capable devices, for example the PE device 102. For example, the cellular transceiver 112 may correspond to cellular towers and/or base stations within a cellular communication system.

The PAN device 124 may comprise suitable logic, circuitry and/or code that may enable performing some accessory functionality in conjunction with the use of the PE device 102 based on a PAN protocol. For example, the PAN device 124 may comprise a hands-free headset that may be utilized, in conjunction with the PE device 102 to facilitated conducting cellular based calls. The PE device 102 may interact with the PAN device 124 via one or more PAN interfaces, which may be based on wired and/or wireless PAN protocols. For example, the PE device 102 may communicate with the PAN device 124 via the WPAN link 126. The WPAN link 126 may be based on a standardized technology for inter-device short range communication. For example, the WPAN link 126 may correspond to Bluetooth, ZigBee, and/or Ultra-Wideband (UWB) connections between the PAN device 124 and the PE device 102.

The backbone network 116 may comprise suitable hardware, logic, circuitry, and/or code that may be operable to provide overall system connectivity among local and/or remote sub-networks. The backbone network 116 may be enabled to interact with, and connect different wired and/or wireless technologies. For example, the backbone network may comprise a standard telephony network (POTS) that may enable data connectivity between different interface nodes linking wired and/or wireless networks comprising WLAN networks, WiMAX networks, cellular networks, and/or LAN networks.

The local network 118 may comprise suitable logic, circuitry and/or code that may enable local connectivity. This local connectivity may comprise use of Local Area Network (LAN) technologies that enable data services, including but not limited to, IEEE 802.3 Ethernet. Other technologies may comprise WiMAX. The local network 118 may be accessed, for example, by the PE device 102, via wireless network 110 and/or the cellular network 114, and the backbone network 116.

In operation, the PE device 102 may be utilized to perform one or more tasks requested via users of the PE device 102. For example, the PE device 102 may enable personal communication, playing and/or recording audio/video streams, and/or may be utilized as a gaming counsel. The PE device 102 may also enable connectivity via a plurality of available networks and/or communication interfaces, which may be necessary to perform requested tasks. For example, the PE device 102 may utilize the wireless link 120 to access the wireless network 110 via the access point 106. The PE device 102 may also utilize the cellular link 122 to access the cellular network 114 via the cellular transceiver 112. The PE device 102 may communicate with the local networked device 104b via the wireless network 110 through the access point 106 and the distribution network 108. The distribution network 108 and/or the cellular network 114 may also enable forwarding messages and/or data sent from, and to the PE device 102.

The backbone network 116 may enable connectivity between local networks, for example wireless network 110 and/or the cellular network 114, and remote networks, comprising, for example, the local network 118. Protocol-based operations may be performed to facilitate the transmission of information through all the different components. This may comprise use of exemplary protocols such as TCP, IP, UPD, and/or SS7. Network connectivity and/or communication interfaces supported via the PE device 102 may enable communicating with other devices. For example, the PE device may communicate with the local networked device 104b via the wireless network 110. The remote device 104c may be enabled to communicate with the PE device 102 through the backbone network 116, via the local network 118. The PE device 102 may also be enabled to communicate directly with other devices and/or resources. For example, the PE device 102 may communicate directly with the PAN device 124 via the WPAN link 126. The PE device 102 may also communicate directly with the local wireless device 104a, and such communication may be based on existing wireless and/or wired interfaces, and/or the communication may be based on device-specific interfaces that may be limited to class of devices comprising the PE device 102 and the local wireless device 104a.

A user of the PE device 102 may request tasks that may be performed directly via the PE device 102, and/or via the connectivity of PE device 102 to available networks, devices, and/or resources. For example, the PE device 102 may be enabled to communicate with the local networked device 104b and/or the remote device 104c to facilitate accessing services provided by the local networked device 104b and/or the remote device 104c. The PE device 102 may be enabled, for example, to access media, storage, processing, and/or gaming services based on one or more tasks requested by a user of the PE device 102. The PE device 102 may also be enabled to utilize devices available directly via communication interfaces within the PE device 102. In an exemplary embodiment of the invention, when requested by a user, the PE device 102 may communicate multimedia files received from the local networked device 104b and/or the remote device 104c to the local wireless device 104c, which may enable, improved output quality of audio and/or video contents of the multimedia files.

The PE device 102 may be enabled to generate, store, and/or update user configuration information that may be utilized in facilitating use of the PE device 102 by a particular user to perform requested tasks, and/or in identifying and/or authenticating the user. The user configuration information may also be generated, stored, and/or updated remotely, in the remote device 104c for example, based on communications via the PE device 102, to ensure security and/or efficiency. The user configuration information may comprise, for example, information pertaining to device configuration and/or operational preferences specific to the device user and/or various use settings, network connectivity, service access, secure access information, network and service access information and/or preferences that are unique to particular users, and/or manner of use of available resources. For example, the user configuration information may specify various user specific device operational preferences, comprising favorite broadcast channels and/or website, favorite games, game status information, and media consumption settings. Exemplary media consumption settings may comprise file types and/or video or audio presentation preferences, website access information, user interface configuration preferences, and/or directory information. The user configuration information may also specify particular devices, for example, the remote device 104c, which may be accessed to perform certain type of operations and/or to store and retrieve specific category of data. The user configuration information may also specify connectivity related information comprising, for example, types of networks to be connectively coupled to, the wireless network 110 for example, and/or other performance related criteria such as cost, availability, bandwidth level, QoS capabilities, security, and reliability. The PE device 102 may also enable a set of the plurality of supported users to share user configuration information, wherein such set of users may be treated as a specific group.

The PE device 102 may also be enabled to identify a particular user in a variety of manners. For example, the PE device 102 may identify a particular user by login information, which may be determined based on user configuration information; physical attributes of the person, which may be derived from biometric functionality that may integrated within the PE device 102 or utilized externally to it; and/or based on predetermined associations between particular user and peripheral devices, resources, and/or communication interfaces.

Figure 1B:
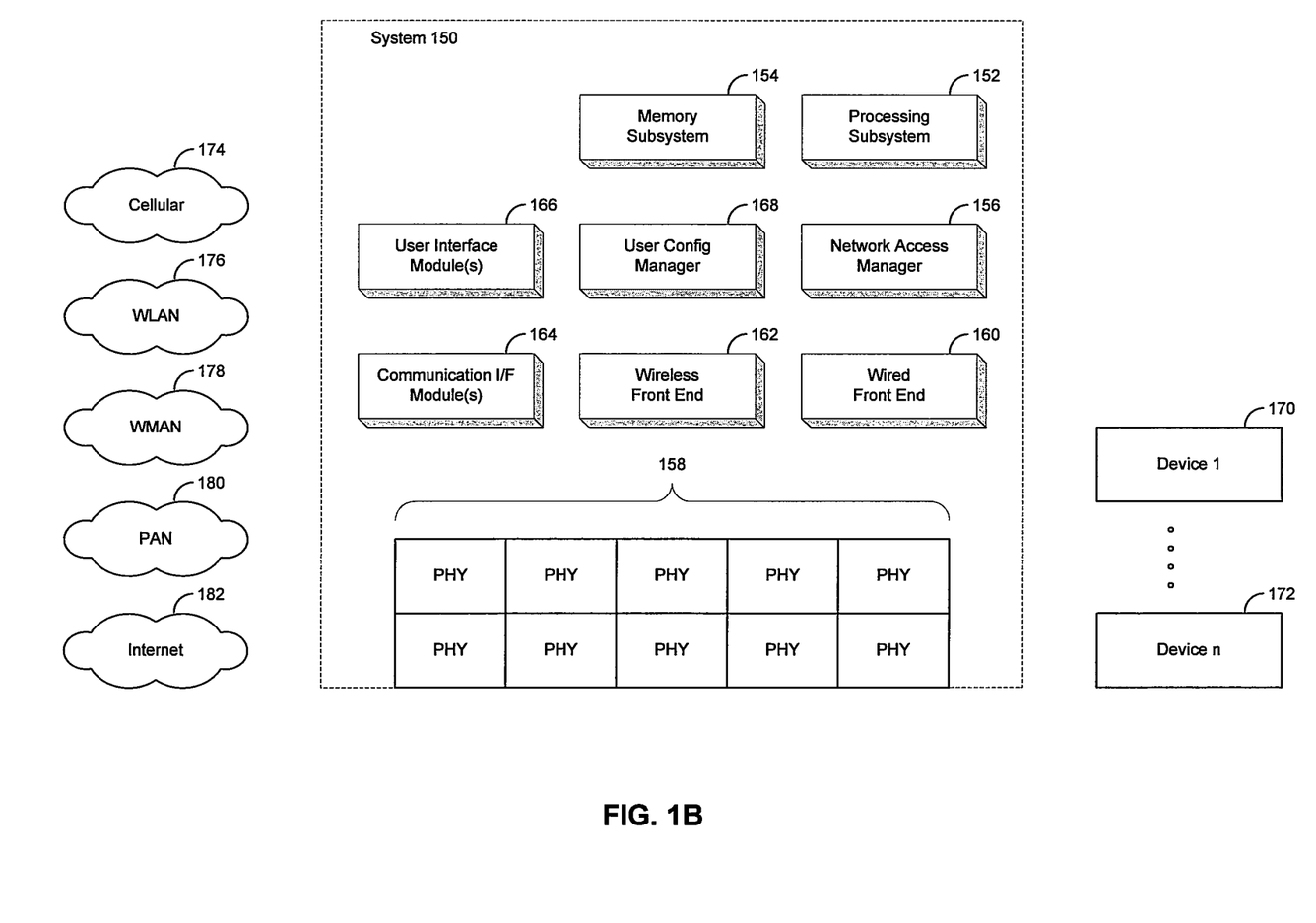
FIG. 1B is a block diagram that illustrates an exemplary system that may be integrated within a personal electronic (PE) device to enable management of user configuration, and utilization of plurality of communication interfaces and/or devices, in accordance with an embodiment of the invention.

FIG. 1B is a block diagram that illustrates an exemplary system that may be integrated within a personal electronic (PE) device to enable management of user configuration, and utilization of plurality of communication interfaces and/or devices, in accordance with an embodiment of the invention. Referring to FIG. 1B, there is shown a system 150, a processing subsystem 152, a memory subsystem 154, a network access manager 156, a plurality of PHY layers 158, a wired front-end 160, a wireless front-end 162, a communication interface module 164, a user interface modules 166, a user configuration manager 168, a plurality of devices 170, . . . , 172, a cellular network 174, a wireless local area network (WLAN) 176, a Wireless Metropolitan Area Networks (WMAN) 178, a Personal area network (PAN) 180, and an internet network 182.

The system 150 may comprise the processing subsystem 152, the memory subsystem 154, the network access manager 156, the plurality of PHY layers 158, the wired front-end 160, the wireless front-end 162, the communication interface modules 164, the user interface modules 166, the user configuration manager 168. The system 150 may also comprise additional suitable logic, circuitry, and/or code that may enable management of user configuration, and utilization of plurality of communication interfaces and/or devices.

The processing subsystem 152 may comprise suitable logic, circuitry and/or code that enables performing processing operations. The invention may not be limited to a specific processor, but may comprise for example, a general purpose processor, a specialized processor or any combination of suitable hardware, firmware, software and/or code, which may be enabled to provide particular processing operations. For example, the processing subsystem 152 may comprise a plurality of processors that may enable performing various processing operations, comprising general control and/or processing functionality, and/or processing pertinent to particular tasks and/or operations. The memory subsystem 154 may comprise suitable logic, circuitry and/or code that may enable storage and/or retrieval of data and/or code in the system 150. For example, the memory subsystem 154 may comprise a plurality of memory components which may be utilized by the processing subsystem 152 and/or the remaining subsystems and/or components in system 150 during various operations in the system.

The network access manager 156 may comprise suitable logic, circuitry, and/or code that may enable performing management and/or control operations that may facilitate access to available networks. For example, the network access manager 156 may be utilized within the system 200 to enable access to one or more of the cellular network 174, the WLAN network 176, the WMAN network 178, the PAN network 180, and/or the internet network 182. Each of the plurality of PHY layers 158 may correspond to the physical layer within the Open System Interface (OSI) model, which may enable transmitting raw bits via communication links based on a wired or wireless interface. For example, one of the plurality of PHY layers 158 may correspond to the physical layer within the Bluetooth stack, which may comprise functionality that enable transmission and/or reception of raw bits via Bluetooth based communication links.

The wired front-end 160 may comprise suitable logic, circuitry and/or code that may enable transmission and/or reception of communication via one or more wired interfaces, based on, for example, one or more of the plurality of PHY layers 158. For example, the wired front-end 160 may enable communications via USB terminals, modem connectivity, external memory devices interfaces, and/or FireWire interface. The wireless front-end 162 may comprise suitable logic, circuitry and/or code that may enable transmission and/or reception of communication via one or more wireless based interface, based on, for example, one or more of the plurality of PHY layers 158. For example, the wireless front-end 162 may comprise antenna systems that may enable transmission and/or reception of communication via WLAN, Bluetooth, WiMAX, and/or cellular based interfaces.

The communication interface modules 164 may comprise suitable logic, circuitry and/or code that enables, via the system 150, utilization, control, and/or management of communication via plurality of communication interfaces, for example via the wired front-end 160 and/or the wireless front-end 162, based on one or more corresponding layers in the plurality of the PHY layer 158. For example, the communication interface modules 164 may comprise modules to enable communication via various wireless and/or wired communication interface, comprising, Bluetooth interface, other WPAN (IEEE 802.15) interface, WLAN (IEEE 802.11) interface, WiMAX (IEEE 802.16) interface, Mobile Broadband Wireless Access (MBWA, IEEE 802.20) interface, Time Division Multiple Access (TDMA) interfaces, GSM/GPRS/EDGE interfaces, CDMA/CDMA200/WCDMA interfaces, H.323 interface, USB interface, and/or Modem interface.

The user interface modules 166 may comprise suitable logic, circuitry and/or code that enables utilization of various user interfaces that may be available via the system 150. For example, the system 150 may be integrated within a device, for example the PE device 102, to enable supporting user interfaces in the device to enable direct interactions with the device by users of the device. The user interface modules 166 may enable utilization of video based input/output (I/O) interfaces, via display and/or digital camera components in the system 150 for example; the user interface modules 166 may also enable of audio based I/O interfaces, via speaker and/or microphone components in the system 150 for example. The user interfaces modules 166 may also enable utilization of physical based input/output (I/O) interfaces, via touch screen, vibration, gyroscopic and/or keypad components in the system 150 for example.

The user configuration manager 168 may comprise suitable logic, circuitry and/or code that enables performing of management and/or control operations pertaining to the user configuration information corresponding to a supported user, or a group of users, of a device that may comprise the system 150. For example, where the system 150 may be integrated within the PE device 102, the user configuration manager 168 may enable generation, storage, updating, and/or use of user configuration information, substantially as described with respect to FIG. 1.

Each of the plurality of devices 170, . . . , 172, may comprise suitable logic, circuitry and/or code that is enabled to provide, external to device comprising the system 150, various services and/or functionality that may be necessary to perform a requested task via the system 150. For example, the plurality of devices 170, . . . , 172, may comprise the local wireless device 104a, the local networked device 104b, and/or the remote device 104c, substantially as described with respect to FIG. 1.

The cellular network 174 may comprise suitable logic, circuitry and/or code that may enable implementing a functional block corresponding to a cellular technology, comprising, for example, but not limited to, CDMA, WCDMA, CDMA1000, HSDPA, GSM, GPRS, EDGE, and/or UMTS. The WLAN network 176 may comprise suitable logic, circuitry and/or code that may enable implementing a functional block corresponding to a WLAN protocol, including, for example, IEEE 802.11. The WMAN network 178 may comprise suitable logic, circuitry and/or code that may enable implementing a functional block corresponding to a WMAN protocol, comprising, for example, IEEE 802.16. The PAN network 180 may comprise suitable logic, circuitry and/or code that may enable implementing a functional block corresponding to a PAN interface. The PAN network 180 may comprise wired based connectivity, via buses such as Universal Serial Bus (USB), for example. Additionally, wireless personal area network (WPAN) may be utilized, comprising, for example, WPAN protocols such as Bluetooth (IEEE 802.15), UWB, and/or ZigBee. The Internet network 182 may comprise suitable logic, circuitry and/or code that may enable implementing a functional block corresponding to an internet protocol, including Internet Protocol (IP) for example.

In operation, the system 150 may be integrated within a device, for example the PE device 102, to enable management of user configuration, and utilization of plurality of communication interfaces and/or devices. The processing subsystem 152 and/or the memory subsystem 152 may be utilized to enable overall control and management, and/or to enable management and/or control during particular operations within the system 150, for example, during DSP, audio, and/or video processing.

The system 150 may enable connectivity related operations to facilitate performing tasks requested via the PE device 102. For example, network connectivity may be performed via the network access manager 156, which may enable managing access to one or more of the cellular network 174, the WLAN network 176, the WMAN network 178, the PAN network 180, and/or the internet network 182. During network accessibility operations, the system 150 may utilize appropriate PHY functionality, within the plurality of PHY layers 158, to enable transmission and/or reception of communication between the system 150 and the corresponding network. For example, to facilitate connectivity with the WLAN network 176, the network access manager 156 may be enabled to utilize a WLAN PHY within the plurality of PHY layers 158 to enable the system 150 to perform WLAN based communications. The system 150 may also enable the PE device 102 to utilize one or more of the plurality of devices 170, . . . , 172, which may be utilized to perform specific operations that may not be available, or optimal, directly via the PE device 102. Network connectivity, via the network access manager 156, may be utilized to enable access to the desired devices. Additionally, the system 150 may be enabled to utilize appropriate PHY functionality within the plurality of PHY layers 158, to enable direct transmission and/or reception of messaging between the system 150 and the corresponding device(s).

The system 150 may enable a user of the PE device 102 to interact indirectly via the user interface modules 166. For example, the user interface modules 166 may enable users of the PE device 102 via video based I/O interfaces, audio based I/O interfaces, and/or physical based I/O interfaces. The system 150 may also enable the user to communicate indirectly, via network connectivity. For example, communications between users and the system 150 may be transmitted and/or received via the wireless front-end 256 and/or the wired front-end 258, based on one or more of the various interfaces supported via the communication modules 164.

The user configuration manager 168 may enable performing user configuration operation via the system 150, including, for example, generation, storage, and/or update of user configuration information. The user configuration operations may be performed directly via system 150. For example, the user configuration manager 168 may enable performing generation, storage, and/or updating of user configuration information within the system 150, via the processing subsystem 152 and/or the memory subsystem 154. In some instances, at least a portion of the user configuration operations may be performed external to the system 150, utilizing, for example, network connectivity and/or accessibility to available devices and/or resources via various communication interfaces. For example, the user configuration manager 168 may be enabled to communicate with one or more of the plurality of devices 170, ..., 172, via the network access manager 156 and/or the communication interface modules 166, to enable performing at least a portion of the generation, storage, and/or updating of user configuration information via such devices.

The generation of the user configuration information, via the user configuration manager 168, may be performed automatically, during initial setup on a device comprising the system 150 for example. The generation of the user configuration information may also be perform manually, based on user commands, for example, which may communicated directly into the system 150 via the user interface 166, and/or indirectly via the communication interface modules 164 for example. The generated user configuration information may be updated. The updating of the user configuration information may be performed manually, based on user commands for example, which may communicated directly into the system 150 via the user interface 166, and/or indirectly via the communication interface modules 164. In some instances, the updating of the user configuration information may be performed automatically, based on pre-determined conditions. For example, the user configuration information may be updated and/or modified at pre-determined periodic intervals, when a device comprising the system 150 is used in manner different than existing operational preferences, and/or when an update is triggered by specified use and/or operating conditions.

Generated and/or updated user configuration information may be stored within the system 150, for example via the memory subsystem 154. Alternatively, the generated and/or updated user configuration information may be uploaded into a remote storage entity, within one or more of the plurality of devices 170, ..., 172 for example.

Figure 2:
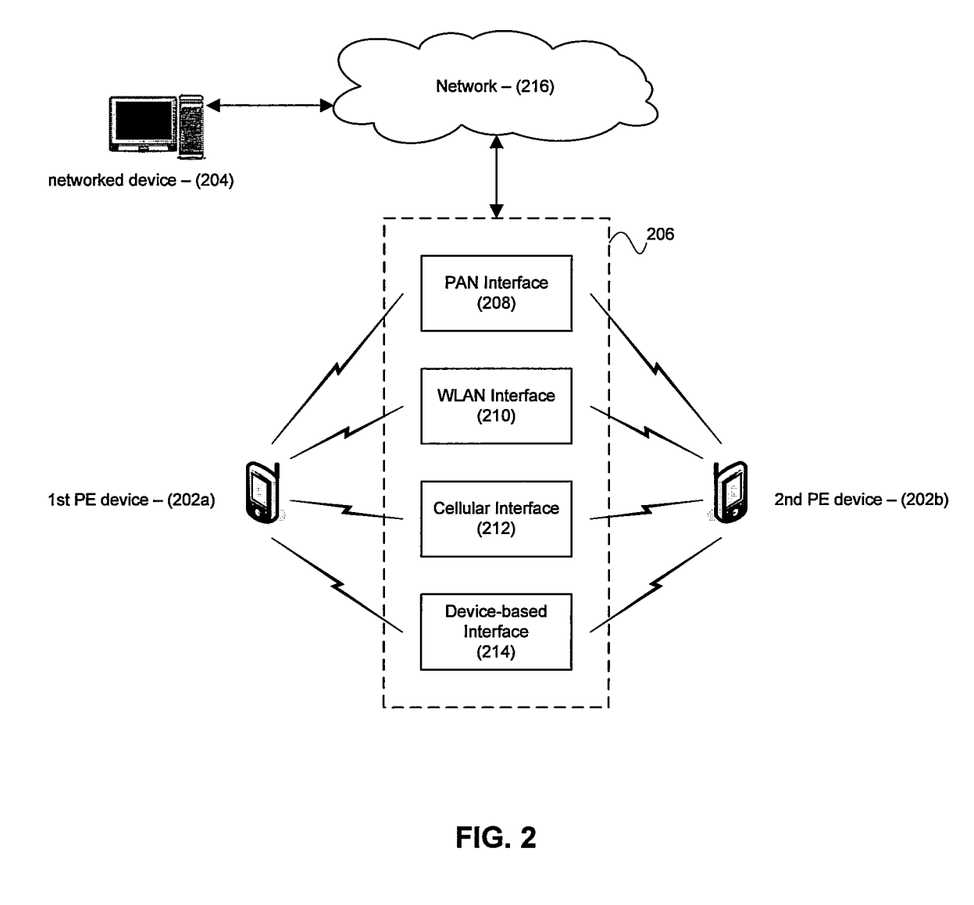
FIG. 2 is a block diagram that illustrates use of stored user preference information to configure a secondary personal electronic (PE) device, in accordance with an embodiment of the invention.

FIG. 2 is a block diagram that illustrates use of stored user preference information to configure a secondary personal electronic (PE) device, in accordance with an embodiment of the invention. Referring to FIG. 2, there is shown a first PE device 202a, a second PE device 202b, a networked device 204, a plurality of communication interfaces 206, a personal area network (PAN) interface 208, a Wireless Local Area Network (WLAN) interface 210, a cellular interface 212, and a device-based interface 214, and a network 216.

Each of the PE devices 202a and 202b may be substantially similar to the PE device 102. For example, each of the PE devices 202a and 202b may comprise an instance of the system 150 to enable management of user configuration, and utilization of plurality of communication interfaces and/or devices. The networked device 204 may comprise a device that may be enabled to communicate with the PE devices 202a and/or 202b, via the plurality of communication interfaces 206 and/or the network 216 for example, to enable performing tasks requested via the PE devices 202a and/or 202b. For example, the networked device 204 may be substantially similar to the local wireless device 104a, the local networked device 104b, and/or the remote device 104c.

The plurality of communication interfaces 206 may comprise one or more interfaces that may enable direct communications between PE devices 202a and 202b, and/or may enable connectivity to the networked device 204, via the network 216 for example. The plurality of communication interfaces 206 may comprise one or more wireless interfaces. The invention may not be limited to a specific type of wireless interface, but may comprise for example, the PAN interface 208, the WLAN interface 210, and/or the cellular interface 212. The plurality of communication interfaces 206 may also comprise the device-based interface 214, which may enable communication between specific types of devices. The PAN interface 208 may comprise suitable functionality that enables forming connections based on the PAN protocol, including, for example, Bluetooth (IEEE 802.15), ZigBee, and/or UWB. The WLAN interface 210 may comprise suitable functionality that enables forming connections based on the WLAN standard (IEEE 802.11). The cellular interface 212 may comprise suitable functionality that enables forming connections based on one or more cellular standards comprising GSM/GPRS/EDGE, CDMA, HSDPA, UMTS, LTE and CDMA2000. The device-based interface 214 may comprise suitable functionality that enables forming connections between specific devices. For example, the PE device 202a, the PE device 202b, and/or the networked device 204 may be enabled to utilize a proprietary standard of wireless protocol to facilitate communication between these devices.

The network 216 may comprise suitable hardware, logic, circuitry, and/or code that is operable to provide connectivity among local and/or remote sub-networks. The network 216 may be enabled to interact with, and connect to different wired and/or wireless interfaces. For example, the network 216 may comprise a telephony network such as a plain old telephone system (POTS) and/or an a packet based network that may enable data connectivity between different interface nodes linking wired and/or wireless networks comprising WLAN networks, WiMAX networks, PAN networks, cellular networks, and/or LAN networks. The network 216 may enable use of the networked device 204, via the plurality of communication interfaces 206, by the PE devices 202a and/or 202b, to perform various requested tasks, including, for example, storage and/or retrieval of user configuration information.

In operation, the PE device 202a may be enabled to develop user configuration information. For example, the 202a may comprise the system 150, and may be able generate, store, and/or update the user configuration information, substantially as described with respect to FIG. 1A. The user configuration information may be developed directly within the PE device 202a, utilizing, for example, the system 150, substantially as described with respect to FIG. 1B.

The user configuration information development, maintenance and/or administration may also be performed remotely, in the networked device 204, based on communication transmitted and/or received by the PE device 202a, via the plurality of communication interfaces 206 and/or the network 216 for example. The user configuration information may be stored directly within the PE device 202a, via the memory subsystem 154 in the system 150 for example. The user configuration information may also be uploaded, downloaded and/or otherwise communicated to the networked device 204 device, via network connectivity between the PE device 202a and networked device 204, to enable remote and/or secure storage, utilizing, for example, the system 150, substantially as described in FIG. 1B. The uploading of user configuration information may be performed manually, based on user commands, which may be communicated into the PE device 202a via the user interface modules 166 in the system 150, substantially as described in FIG. 1B. The uploading of the user configuration information may also be performed automatically, based on specified intervals and/or conditions for example. The user configuration information may be updated, via the PE device 202a for example, and the updated user configuration information may be uploaded into the networked device 204. The updating of the user configuration information may be performed manually, based on user commands, and/or it may be performed automatically, during use of the PE device 202a, based on, for example, specific use conditions.

Where a user of the PE device 202a may initiate use of a secondary PE device, for example the PE device 202b, it may be advantageous to import into the PE device 202b, existing user configuration information generated and/or updated via the PE device 202a. The existing user configuration information may be downloaded into the PE device 202b, and may be utilized, for example, to configure the PE device 202b with similar operations preferences as with the PE device 202b, which are specific to the user of both devices. The PE device 202b may be enabled to receive the user configuration information directly from the PE device 202a. For example, the PE devices 202s and 202b may be enabled to communicate directly via the plurality of communication interfaces 206. The PE device 202b may be enabled, for example, to request and/or receive the user configuration information from the PE device 202a via the PAN interface 208, the WLAN interface 210, the cellular interface 212, and/or the device-specific interface 214. In some instances, the device 202b may also be enabled to receive the user configuration information via a networked device, for example the networked device 204, which may be utilized and a centralized depository for user configuration information accessible by one or more users. For example, user configuration information developed, stored, and/or updated by the PE device 202a via the networked device 204 may be received by PE device 202b from the networked device 204.

The PE device 202b may be enabled, for example, to request and/or receive the user configuration information from the networked device 204 via the network 216 and/or the plurality of communication interfaces 206. The downloading and/or use of the user configuration information by the PE device 202b may be performed manually, based on user commands for example; and/or it may be performed automatically, based on, for example, specific use conditions. For example, initiating download and configuration of the PE device 202b utilizing existing user configuration information may be performed via user commands communicated into the PE device 202b, via the user interface modules 166 in the system 150 for example, substantially as described in FIG. 1B. In some instances, it may be determined whether a match may exist between a user of the PE device and identity of user corresponding to user configuration information stored within the PE device 202a. The networked device 204 may be operable to automatically trigger download and configuration of the PE device 202b utilizing existing user configuration information.

Figure 3:
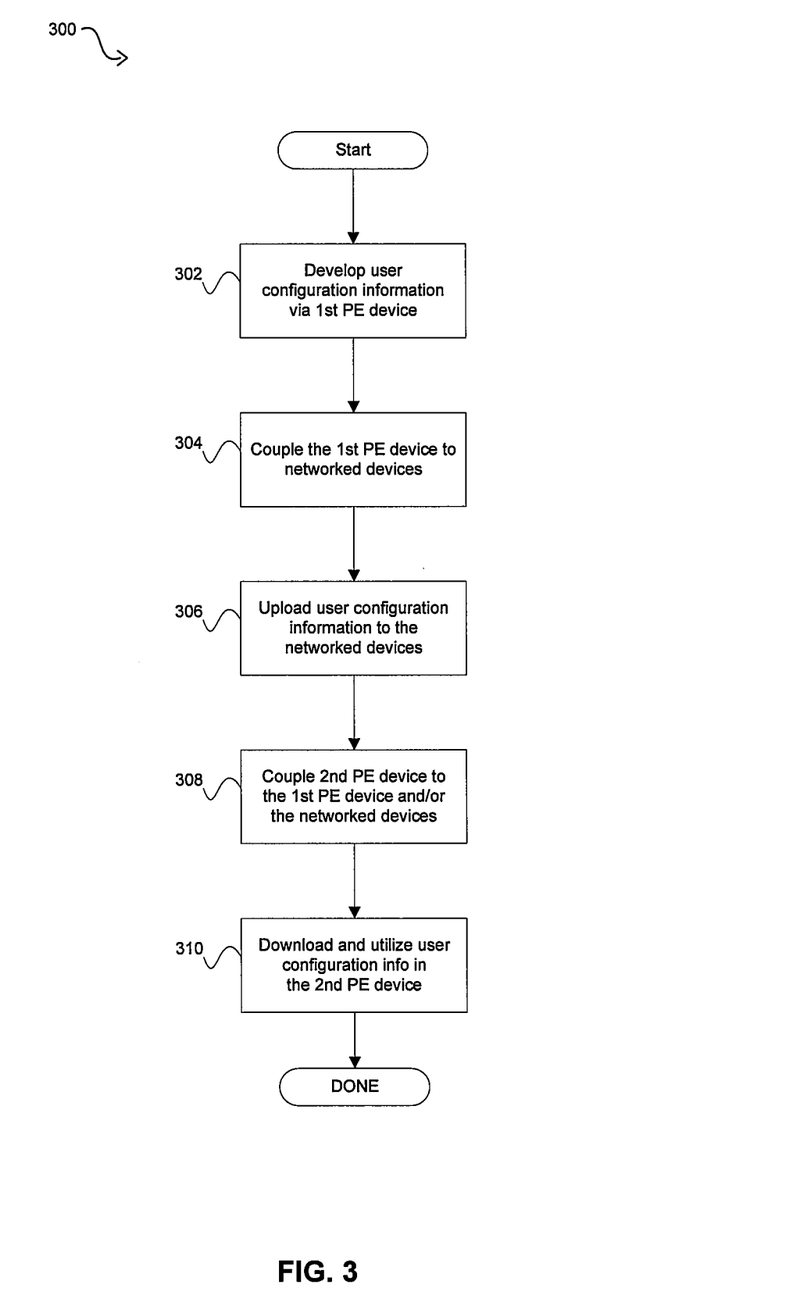
FIG. 3 is a flow chart that illustrates use of stored user preference information to configure a secondary personal electronic (PE) device, in accordance with an embodiment of the invention.

FIG. 3 is a flow chart that illustrates use of stored user preference information to configure a secondary personal electronic (PE) device, in accordance with an embodiment of the invention. Referring to FIG. 3, there is shown a flow chart 300 comprising a plurality of exemplary steps, which may enable.

In step 302, user configuration information may be developed via a first personal electronic (PE) device. For example, user configuration information may be generated and/or updated via the PE device 202a, substantially as described in FIG. 2. In step 304, the PE device may be communicatively coupled to networked devices to enable generation, updating, and/or storage of user configuration information. For example, the PE device 202a may be communicatively coupled to the networked device 204, substantially as described in FIG. 2, to enable uploading of user configuration information. In an embodiment of the invention, the coupled networked device may also be utilized to perform the generation and/or updating of the user configuration information based on communication by the PE device.

In step 306, user configuration information may be uploaded from the PE device to the networked device. For example, user configuration information may be uploaded from the PE device 202a to the networked device 204. In step 308, a second PE device may be communicatively coupled to the first PE device and/or the networked devices. For example, the PE device 202b may be communicatively coupled to the PE device 202a, and/or the networked device 204, via the network 216 and/or the plurality of communication interface 206, substantially as described in FIG. 2. In step 310, the second PE device may download and use user configuration information. For example, the PE device 202b may download the user configuration information from the PE device 202a and/or the networked device 204, and the downloaded user configuration information may be utilized to enable configuring the PE device 202b using, for example, existing user operational preferences.

Various embodiments of the invention may comprise a method and system for a networked self-configuring communication device utilizing user preference information. The personal electronic (PE) device 202a may enable generation, updating, and/or storage of user configuration information. The user configuration information may comprise information pertaining to device configuration and/or operational preferences specific to the device user and/or various use settings, connectivity, and/or use of available resources. The generation, updating, and/or storage of the user configuration information may be performed manually and/or automatically, and may be performed directly within the PE device 202a and/or via the networked device 204. The generation, updating, and/or storage of the user configuration information may also be performed directly within the PE device 202a, and/or via the networked device 204, which may be communicatively coupled to the PE device 202a. The PE device 202b may be enabled to communicatively couple to the PE device 202a and/or the networked device 204. The PE device 202b may then be enabled to download existing user configuration information from the PE device 202a and/or the networked device 204; and the downloaded user configuration may be utilized to configure the PE device 202b.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a networked self-configuring communication device utilizing user preference information.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed:

1. A method for configuring electronic devices, the method comprising:
    identifying a user of a second personal electronic device;
    downloading at least a portion of user configuration information corresponding to said identified user into said second personal electronic device, wherein said user configuration information is developed via a first personal electronic device for a specific user of said first personal electronic device; and
    configuring said second personal electronic device utilizing at least said downloaded at least said portion of said user configuration information, wherein
    at least one of the following is satisfied:
        the downloading comprises directly downloading said at least a portion of user configuration information into said second personal electronic device from said first personal electronic device when said devices are communicatively coupled,
        at least a portion of said developed user configuration information is uploaded from said first personal electronic device to a networked device, wherein said networked device is distinct from said second personal electronic device,
        said development of said user configuration information for said first personal electronic device is performed during initial setup of said first personal electronic device,
        said development of said user configuration information for said first personal electronic device is performed dynamically during use of said first personal electronic device,
        performing said downloading into and/or configuration of said second personal electronic device is based on a determination of a match between said identified user of said second personal electronic device and said specific user of said first personal electronic device,
        a plurality of communication interfaces are utilized in said first personal electronic device and/or said second personal electronic device to perform transmission and/or reception of said user configuration information, or
        said user configuration information comprises device configuration information, operational preferences specific to a user and/or various use settings, network connectivity, service access, secure access information, network and/or service access information and/or preferences that are unique to a particular use, and/or manner of use of available resources.

2. The method according to claim 1, comprising directly downloading said at least a portion of user configuration information into said second personal electronic device from said first personal electronic device when said devices are communicatively coupled.

3. The method according to claim 1, wherein at least a portion of said developed user configuration is uploaded from said first personal electronic device to said networked device, wherein said networked device is distinct from said second personal electronic device.

4. The method according to claim 3, comprising receiving at least a portion of said downloaded user configuration information from said networked device in said second personal electronic device.

5. The method according to claim 3, wherein said uploading is performed manually, based on user command, and/or automatically, based on specified intervals and/or conditions.

6. The method according to claim 1, wherein said development of said user configuration information for said first personal electronic device is performed during initial setup of said first personal electronic device.

7. The method according to claim 1, wherein said development of said user configuration information for said first personal electronic device is performed dynamically during use of said first personal electronic device.

8. The method according to claim 7, wherein said dynamic development of said user configuration information is performed manually, via user specified commands.

9. The method according to claim 7, wherein said dynamic development of said user configuration information is performed automatically, based on said use of said first personal electronic device.

10. The method according to claim 1, comprising performing said downloading into and/or configuration of said second personal electronic device based on determination of a match between said identified user of said second personal electronic device and said specific user of said first personal electronic device.

11. The method according to claim 1, wherein said plurality of communication interfaces are utilized in said first personal electronic device and/or said second personal electronic device to perform necessary transmission and/or reception of said user configuration information.

12. The method according to claim 11, wherein said plurality of communication interfaces comprise one or more of a device-specific interfaces that are supported via said mobile communication interface device.

13. The method according to claim 11, wherein said plurality of communication interfaces comprise one or more wireless interfaces.

14. The method according to claim 11, wherein said transmission and/or reception is performed via a plurality of available networks, which comprise a local internet network, a cable network, a personal area network (PAN), a wireless local area network (WLAN), a Worldwide Interoperability for Microwave Access (WiMAX) network, and/or a cellular network.

15. The method according to claim 1, wherein said user configuration information comprises device configuration information, operational preferences specific to a user and/or various use settings, network connectivity, service access, secure access information, network and/or service access information and/or preferences that are unique to a particular use, and/or manner of use of available resources.

16. A system for configuring electronic devices, the system comprising:
one or more processors in a second personal electronic device that enable identification of a user of a second personal electronic device;
said one or more processors enable download of at least a portion of user configuration information corresponding to said identified user into said second personal electronic device, wherein said user configuration information is developed via a first personal electronic device for a specific user of said first personal electronic device; and
said one or more processors enable configuration of said second personal electronic device by utilizing at least said downloaded at least said portion of said user configuration information, wherein
at least one of the following is satisfied:
said one or more processors enable performing said downloading directly into said second personal electronic device from said first personal electronic device when said devices are communicatively coupled,
at least a portion of said developed user configuration is uploaded from said first personal electronic device to a networked device, wherein said networked device is distinct from said second personal electronic device,
said development of said user configuration information for said first personal electronic device is performed during initial setup of said first personal electronic device,
said development of said user configuration information for said first personal electronic device is performed dynamically during use of said first personal electronic device,
said one or more processors enable performing said downloading into and/or configuration of said second personal electronic device based on determination of a match between said identified user of said second personal electronic device and said specific user of said first personal electronic device,
a plurality of communication interfaces are utilized in said first personal electronic device and/or said second personal electronic device to perform necessary transmission and/or reception of said user configuration information, or
said user configuration information comprises device configuration information, operational preferences specific to a user and/or various use settings, network connectivity, service access, secure access information, network and/or service access information and/or preferences that are unique to a particular use, and/or manner of use of available resources.

17. The system according to claim 16, wherein said one or more processors enable performing said downloading directly into said second personal electronic device from said first personal electronic device when said devices are communicatively coupled.

18. The system according to claim 16, wherein at least a portion of said developed user configuration information is uploaded from said first personal electronic device to said networked device, wherein said networked device is distinct from said second personal electronic device.

19. The system according to claim 18, wherein said one or more processors enable reception of at least a portion of said downloaded user configuration information from said networked device in said second personal electronic device.

20. The system according to claim 18, wherein said uploading is performed manually, based on user command, and/or automatically, based on specified intervals and/or conditions.

21. The system according to claim 16, wherein said development of said user configuration information for said first personal electronic device is performed during initial setup of said first personal electronic device.

22. The system according to claim 16, wherein said development of said user configuration information for said first personal electronic device is performed dynamically during use of said first personal electronic device.

23. The system according to claim 22, wherein said dynamic development of said user configuration information is performed manually, via user specified commands.

24. The system according to claim 22, wherein said dynamic development of said user configuration information is performed automatically, based on said use of said first personal electronic device.

25. The system according to claim 16, wherein said one or more processors enable performing said downloading into and/or configuration of said second personal electronic device based on determination of a match between said identified user of said second personal electronic device and said specific user of said first personal electronic device.

26. The system according to claim 16, wherein said plurality of communication interfaces are utilized in said first personal electronic device and/or said second personal electronic device to perform necessary transmission and/or reception of said user configuration information.

27. The system according to claim 26, wherein said plurality of communication interfaces comprise one or more of a device-specific interfaces that are supported via said mobile communication interface device.

28. The system according to claim 26, wherein said plurality of communication interfaces comprise one or more wireless interfaces.

29. The system according to claim 26, wherein said transmission and/or reception is performed via a plurality of available networks, which comprise a local internet network, a cable network, a personal area network (PAN), a wireless local area network (WLAN), a Worldwide Interoperability for Microwave Access (WiMAX) network, and/or a cellular network.

30. The system according to claim 16, wherein said user configuration information comprises device configuration information, operational preferences specific to a user and/or various use settings, network connectivity, service access, secure access information, network and/or service access information and/or preferences that are unique to a particular use, and/or manner of use of available resources.

* * * * *